United States Patent
Krishnamurthy et al.

(10) Patent No.: US 12,474,925 B2
(45) Date of Patent: Nov. 18, 2025

(54) METHOD AND SYSTEM FOR TRACKING TIME TO MARKET FOR APPLICATION DEPLOYMENT

(71) Applicant: JPMorgan Chase Bank, N.A., New York, NY (US)

(72) Inventors: Satyajit Arivukkodi Krishnamurthy, New Albany, OH (US); Pavani Javvadi, Hyderabad (IN); Matt Bally, Lewis Center, OH (US); Ravindar Reddy Borampet, Hyderabad (IN); Surya Toomu, Hyderabad (IN); Sravanthi Chinthireddy, Rangareddy (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 343 days.

(21) Appl. No.: 18/132,672

(22) Filed: Apr. 10, 2023

(65) Prior Publication Data
US 2024/0289127 A1    Aug. 29, 2024

(30) Foreign Application Priority Data
Feb. 23, 2023   (IN) .............. 202311012450

(51) Int. Cl.
| G06F 9/44 | (2018.01) |
| G06F 8/65 | (2018.01) |
| G06F 8/77 | (2018.01) |
| G06Q 10/10 | (2023.01) |

(52) U.S. Cl.
CPC .............. G06F 8/77 (2013.01); G06F 8/65 (2013.01); G06Q 10/103 (2013.01)

(58) Field of Classification Search
CPC ............ G06F 8/65; G06F 8/77; G06Q 10/103
See application file for complete search history.

(56) References Cited

U.S. PATENT DOCUMENTS

| 11,023,222 B1* | 6/2021 | Sethi ..................... G06F 8/65 |
| 11,704,121 B2* | 7/2023 | Kesiboyana .............. G06F 8/71 |
| | | 717/101 |
| 11,899,570 B2* | 2/2024 | Velammal ................ G06F 8/75 |
| 2020/0089485 A1* | 3/2020 | Sobran ..................... G06F 8/65 |
| 2021/0294716 A1* | 9/2021 | Mosquera ................ G06F 8/77 |
| 2023/0168889 A1* | 6/2023 | Ghosh .................... G06F 8/77 |
| | | 717/103 |
| 2023/0208843 A1* | 6/2023 | Katahanas ............ H04L 63/102 |
| | | 726/4 |

* cited by examiner

*Primary Examiner* — Qamrun Nahar
(74) *Attorney, Agent, or Firm* — GREENBLUM & BERNSTEIN, P.L.C.

(57) ABSTRACT

A method and a system for accurately tracking and capturing a time to market for software applications and feature updates thereof are provided. The method includes: receiving a notification that a requested update to the application is stored in a code depository and is ready for a deployment; retrieving, from the code depository, metadata that relates to the requested update; extracting, from the code depository based on the retrieved metadata, information that is associated with the requested update to the application, such as project management software instruction set identifiers; and modifying the information based on the deployment.

14 Claims, 4 Drawing Sheets

METHOD AND SYSTEM FOR TRACKING TIME TO MARKET FOR APPLICATION DEPLOYMENT

CROSS-REFERENCE TO RELATED APPLICATIONS

This application claims priority benefit from Indian application Ser. No. 202311012450, filed Feb. 23, 2023 in the India Patent Office, which is hereby incorporated by reference in its entirety.

BACKGROUND

1. Field of the Disclosure

This technology generally relates to methods and systems for deploying software applications, and more particularly to methods and systems for accurately tracking and capturing a time to market for software applications and feature updates thereof.

2. Background Information

Many commercial entities rely on suites of software applications to perform a wide variety of functions. Typically, the software applications require maintenance in the form of updates. In addition, new features may be added to applications, in order to expand functionality thereof.

In many instances, users of software applications rely on an understanding that the software is being properly maintained and that the latest versions of the software are deployed and available. In this aspect, it is important to keep users informed about the status of software updates, and to be able to accurately project when a particular software application and/or update is expected to be available.

Accordingly, there is a need for a method for accurately tracking and capturing a time to market for software applications and feature updates thereof.

SUMMARY

The present disclosure, through one or more of its various aspects, embodiments, and/or specific features or sub-components, provides, inter alia, various systems, servers, devices, methods, media, programs, and platforms for accurately tracking and capturing a time to market for software applications and feature updates thereof.

According to an aspect of the present disclosure, a method for tracking a deployment status of an application is provided. The method is implemented by at least one processor. The method includes: receiving, by the at least one processor, a first notification that a requested update to the application is stored in a memory and is ready for a deployment; retrieving, by the at least one processor from the memory, metadata that relates to the requested update to the application; extracting, by the at least one processor from the memory based on the retrieved metadata, first information that is associated with the requested update to the application; and modifying, by the at least one processor, the first information based on the deployment.

The requested update to the application may be associated with a numbered information technology service management tool ticket.

The first notification may include a commit to repository request message that is associated with a first project management software instruction set.

The first information may include at least one second project management software instruction set that is associated with the requested update to the application.

The modifying may include updating each of the at least one second project management software instruction set to include second information that relates to a deployment date of the requested update to the application.

The modifying may further include updating each of the at least one second project management software instruction set to include third information that relates to a change to the information technology service management tool ticket.

The method may further include: identifying at least one project management software task cluster and at least one project management software proposal that relate to the first project management software instruction set; and modifying each of the at least one project management software task cluster and the at least one project management software proposal based on the deployment.

The method may further include: when the first information has been modified, generating a second notification that the first information has been modified; and transmitting the second notification to at least one predetermined destination.

According to another exemplary embodiment, a computing apparatus for tracking a deployment status of an application is provided. The computing apparatus includes a processor; a memory; and a communication interface coupled to each of the processor and the memory. The processor is configured to: receive, via the communication interface, a first notification that a requested update to the application is stored in the memory and is ready for a deployment; retrieve, from the memory, metadata that relates to the requested update to the application; extract, from the memory based on the retrieved metadata, first information that is associated with the requested update to the application; and modify the first information based on the deployment.

The requested update to the application may be associated with a numbered information technology service management tool ticket.

The first notification may include a commit to repository request message that is associated with a first project management software instruction set.

The first information may include at least one second project management software instruction set that is associated with the requested update to the application.

The processor may be further configured to update each of the at least one second project management software instruction set to include second information that relates to a deployment date of the requested update to the application.

The processor may be further configured to update each of the at least one second project management software instruction set to include third information that relates to a change to the information technology service management tool ticket.

The processor may be further configured to: identify at least one project management software task cluster and at least one project management software proposal that relate to the first project management software instruction set; and modify each of the at least one project management software task cluster and the at least one project management software proposal based on the deployment.

The processor may be further configured to: when the first information has been modified, generate a second notification that the first information has been modified; and transmit, via the communication interface, the second notification to at least one predetermined destination.

According to yet another exemplary embodiment, a non-transitory computer readable storage medium storing instructions for tracking a deployment status of an application is provided. The storage medium includes executable code which, when executed by a processor, causes the processor to: receive a first notification that a requested update to the application is stored in a memory and is ready for a deployment; retrieve, from a memory, metadata that relates to the requested update to the application; extract, from the memory based on the retrieved metadata, first information that is associated with the requested update to the application; and modify the first information based on the deployment.

The requested update to the application may be associated with a numbered information technology service management tool ticket.

The first notification may include a commit to repository request message that is associated with a first project management software instruction set.

The first information may include at least one second project management software instruction set that is associated with the requested update to the application.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
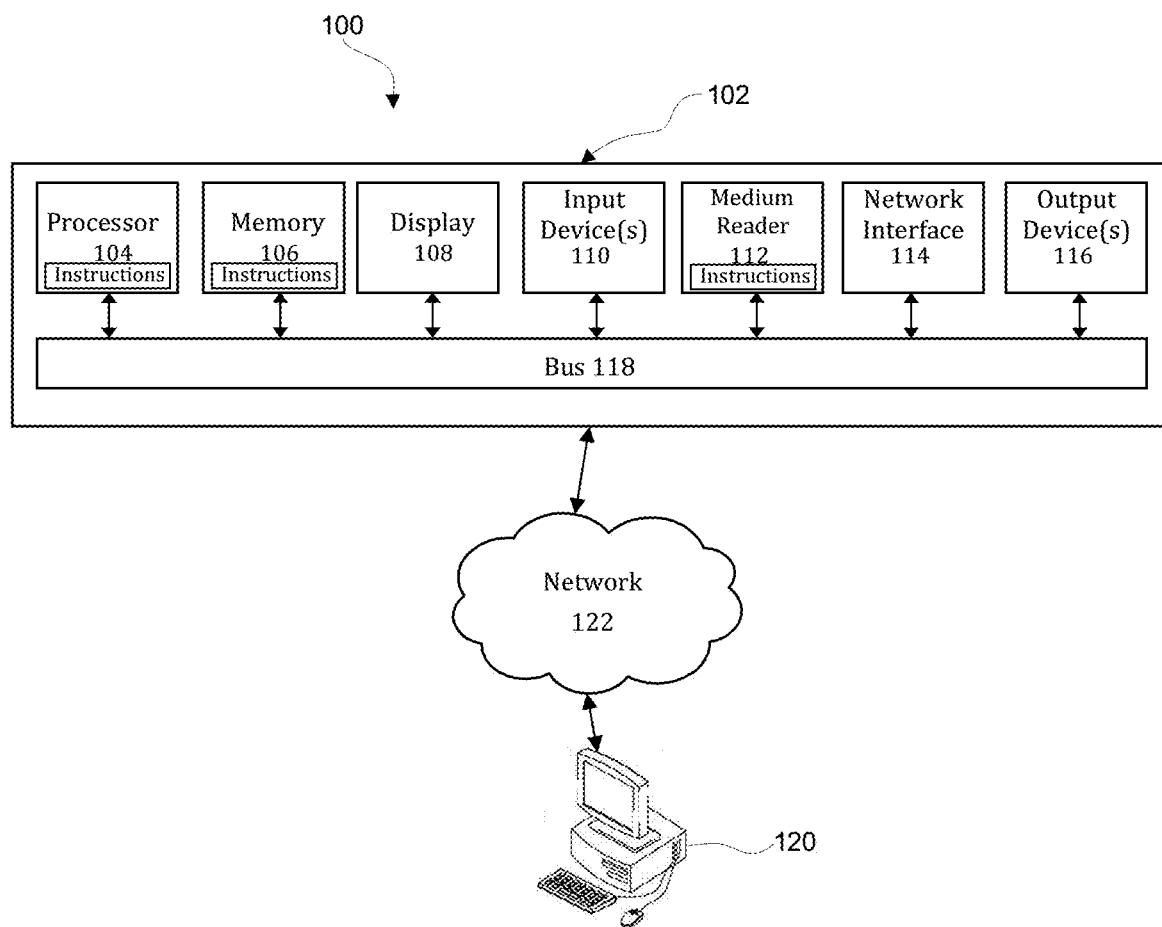
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for accurately tracking and capturing a time to market for software applications and feature updates thereof.

Figure 2:
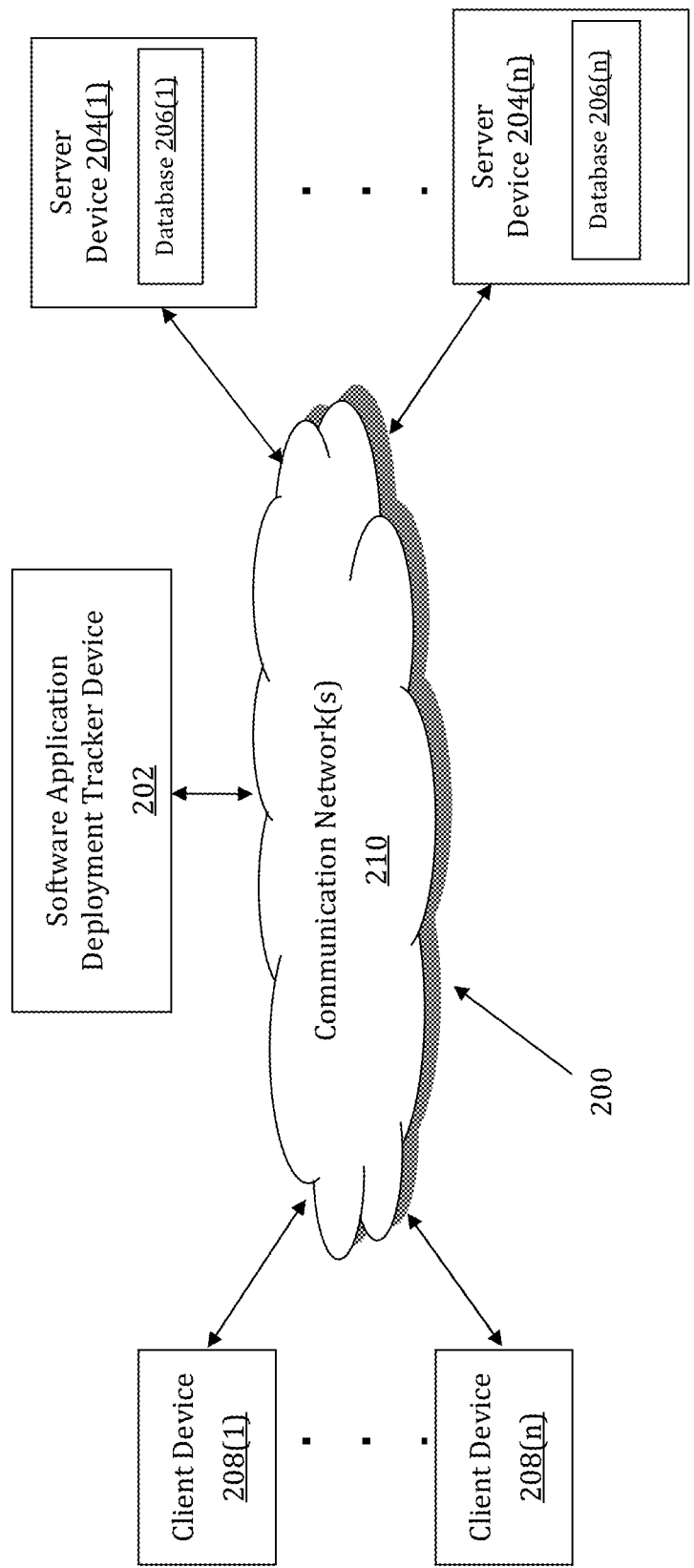
FIG. 2 illustrates an exemplary diagram of a network environment.

Referring to FIG. 2, a schematic of an exemplary network environment 200 for implementing a method for accurately tracking and capturing a time to market for software applications and feature updates thereof is illustrated. In an exemplary embodiment, the method is executable on any networked computer platform, such as, for example, a personal computer (PC).

The method for accurately tracking and capturing a time to market for software applications and feature updates thereof may be implemented by a Software Application Deployment Tracker (SADT) device 202. The SADT device 202 may be the same or similar to the computer system 102 as described with respect to FIG. 1. The SADT device 202 may store one or more applications that can include executable instructions that, when executed by the SADT device 202, cause the SAT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SADT device 202 itself, may be located in virtual server(s) running in a cloud-based computing environment rather than being tied to one or more specific physical network computing devices. Also, the application(s) may be running in one or more virtual machines (VMs) executing on the SADT device 202. Additionally, in one or more embodiments of this technology, virtual machine(s) running on the SADT device 202 may be managed or supervised by a hypervisor.

In the network environment 200 of FIG. 2, the SADT device 202 is coupled to a plurality of server devices 204(1)-204(n) that hosts a plurality of databases 206(1)-206(n), and also to a plurality of client devices 208(1)-208(n) via communication network(s) 210. A communication interface of the SADT device 202, such as the network interface 114 of the computer system 102 of FIG. 1, operatively couples and communicates between the SADT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SADT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SADT devices that efficiently implement a method for accurately tracking and capturing a time to market for software applications and feature updates thereof.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SADT device 202 may be a standalone device or integrated with one or more other devices or apparatuses, such as one or more of the server devices 204(1)-204(n), for example. In one particular example, the SADT device 202 may include or be hosted by one of the server devices 204(1)-204(n), and other arrangements are also possible. Moreover, one or more of the devices of the SADT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SADT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store application-specific software code and information that relates to software application development and deployment status.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the SADT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the SADT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the SADT device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SADT device 202, the server devices 204(1)-204(n), or the client devices 208(1)-208(n), for example, may be configured to operate as virtual instances on the same physical machine. In other words, one or more of the SADT device 202, the server devices 204(1)-204(n), or the client devices 208(1)-208(n) may operate on the same physical device rather than as separate devices communicating through communication network(s) 210. Additionally, there may be more or fewer SADT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
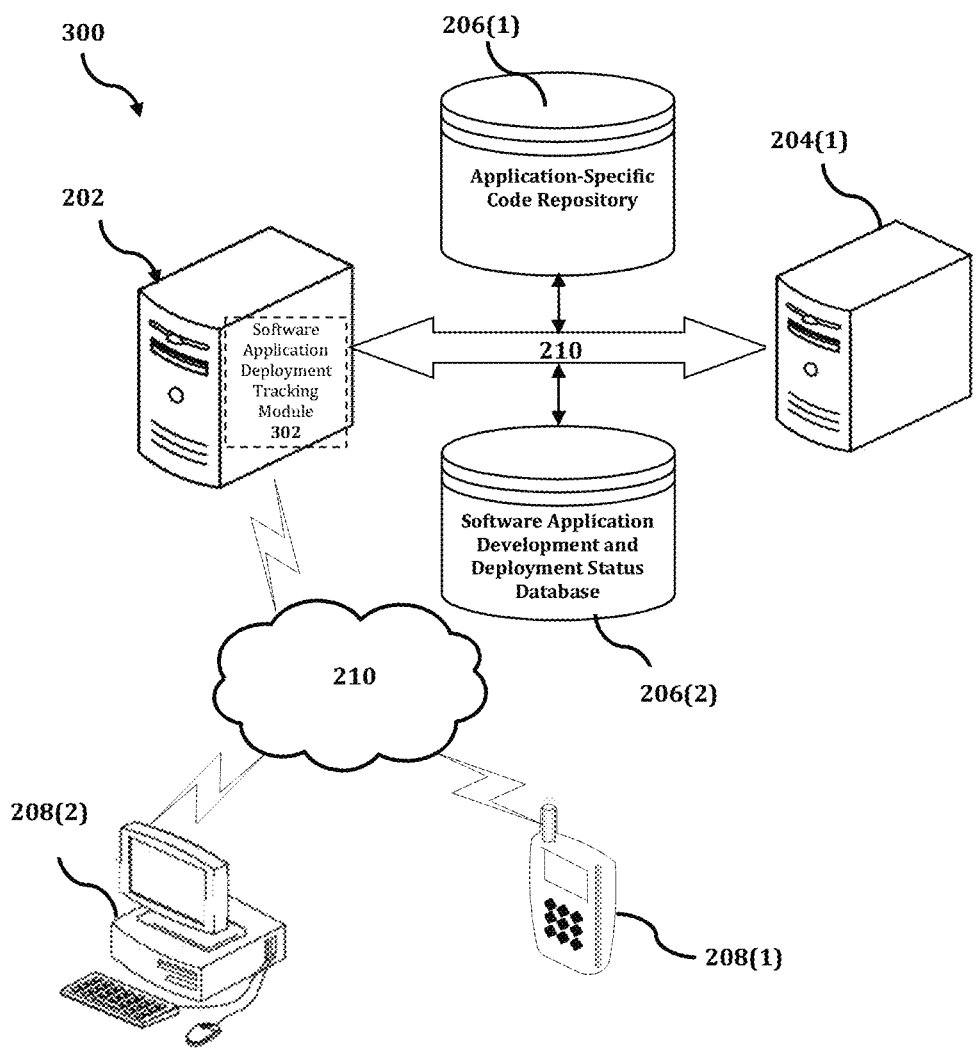
FIG. 3 shows an exemplary system for implementing a method for accurately tracking and capturing a time to market for software applications and feature updates thereof.

The SADT device 202 is described and illustrated in FIG. 3 as including a software application deployment tracking module 302, although it may include other rules, policies, modules, databases, or applications, for example. As will be described below, the software application deployment tracking module 302 is configured to implement a method for accurately tracking and capturing a time to market for software applications and feature updates thereof.

An exemplary process 300 for implementing a mechanism for accurately tracking and capturing a time to market for software applications and feature updates thereof by utilizing the network environment of FIG. 2 is illustrated as being executed in FIG. 3. Specifically, a first client device 208(1) and a second client device 208(2) are illustrated as being in communication with SADT device 202. In this regard, the first client device 208(1) and the second client device 208(2) may be "clients" of the SADT device 202 and are described herein as such. Nevertheless, it is to be known and understood that the first client device 208(1) and/or the second client device 208(2) need not necessarily be "clients" of the SADT device 202, or any entity described in association therewith herein. Any additional or alternative relationship may exist between either or both of the first client device 208(1) and the second client device 208(2) and the SADT device 202, or no relationship may exist.

Further, SADT device 202 is illustrated as being able to access an application-specific code repository 206(1) and a software application development and deployment status database 206(2). The software application deployment tracking module 302 may be configured to access these databases for implementing a method for accurately tracking and capturing a time to market for software applications and feature updates thereof.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the SADT device 202 via broadband or cellular communication. Of course, these embodiments are merely exemplary and are not limiting or exhaustive.

Upon being started, the software application deployment tracking module 302 executes a process for accurately tracking and capturing a time to market for software applications and feature updates thereof. An exemplary process for accurately tracking and capturing a time to market for software applications and feature updates thereof is generally indicated at flowchart 400 in FIG. 4.

Figure 4:
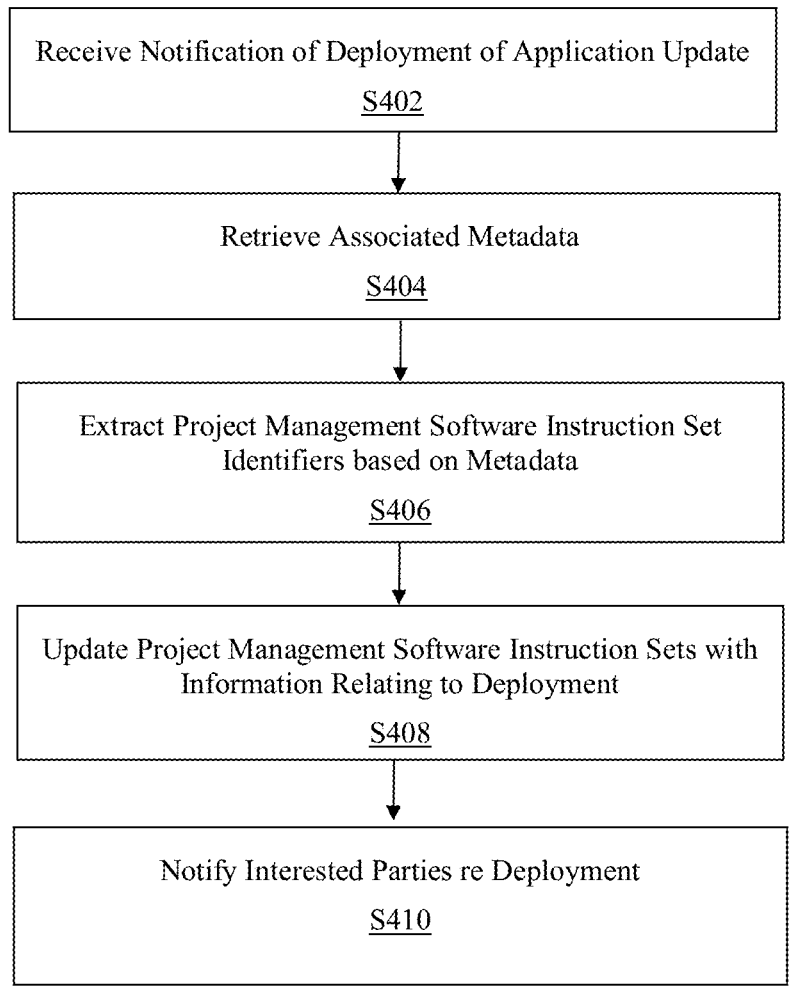
FIG. 4 is a flowchart of an exemplary process for implementing a method for accurately tracking and capturing a time to market for software applications and feature updates thereof.

In process 400 of FIG. 4, at step S402, the software application deployment tracking module 302 receives a notification that a requested update of a software application is stored in a memory, such as, for example, code repository 206(1), and is ready for deployment. In an exemplary embodiment, the requested update to the application is associated with an information technology service management tool ticket, such as, for example, a numbered Service NOW (SNOW) ticket, and the notification includes a commit to repository request message that is associated with a project management software instruction set, such as, for example, a Jira card.

At step S404, the software application deployment tracking module 302 retrieves metadata that relates to the requested update to the application from the memory. Then, at step S406, the software application deployment tracking module 302 uses the metadata to extract information from the memory that is associated with the requested update. In an exemplary embodiment, the extracted information includes project management software instruction set identifiers (e.g., Jira card numbers) that are indicated by the metadata as being related to the requested update to the application.

At step S408, the software application deployment tracking module 302 modifies the extracted information based on the deployment of the requested update to the application. In an exemplary embodiment, this modification is implemented by automatically updating the project management software instruction sets (e.g., Jira cards) that correspond to the project management software instruction set identifiers (e.g., Jira card numbers) included in the extracted information by providing information that relates to a time and/or a date of the deployment. In addition, the modification may also include updating the project management software instruction sets (e.g., Jira cards) by providing information that relates to a change that has been made to the information technology service management tool ticket (e.g., SNOW ticket).

In an exemplary embodiment, the software deployment tracking module 302 may identify a project management software task cluster (e.g., a Jira epic) and/or a project management software proposal (e.g., a Jira initiative) that correspond to the project management software instruction set (e.g., Jira card) that is associated with the commit to repository request message included in the notification received in step S402. The thusly identified project management software task cluster (e.g., Jira epic) and/or project management software task (e.g., Jira initiative) may be updated by providing information that relates to the time and/or date of the deployment.

At step S410, the software application deployment tracking module 302 generates a notification message that indicates that the project management software instruction sets (e.g., Jira cards) have been modified, and then transmits this notification message to a predetermined destination, such as, for example, a user that has an interest in a software application that corresponds to one or more of the modified project management software instruction sets (e.g., Jira cards). In this aspect, users may be kept current about recent software updates in a transparent manner.

In an exemplary embodiment, a method and a system for accurately tracking and capturing a time to market for software applications and feature updates thereof have an objective of capturing when and how code associated with a project management software instruction set (e.g., a Jira card) is deployed to production, i.e., a date of deployment and an information technology service management tool ticket (e.g., a SNOW ticket). The method and system are designed to provide an improved customer experience with transparent completion of software delivery life cycle; accurate time-to-market views; and traceability for risk and controls in evidencing the request-development-deployment process. In an exemplary embodiment, the method provides an answer to a question regarding which issues relating to a particular project have been deployed to production.

In an exemplary embodiment, the method and the system for accurately tracking and capturing a time to market for software applications and feature updates thereof automate capturing when a code is deployed to production and through what change, i.e., information technology service management tool ticket number (e.g., SNOW ticket number). In an exemplary embodiment, when Jira is being used as project management software, every Jira card is related to a Jira Epic, and each Jira Epic is associated with a Jira Initiative, in accordance with Jira hygiene.

In an exemplary embodiment, every commit to repository is required to have a valid project management software instruction set (e.g., a valid Jira card) in the commit message. This is enforced through a source code repository hosting service such as, for example, Bitbucket (e.g., Bitbucket hooks) and an input/output application programming interface such as, for example, Java Nio (e.g., the Nio tollgate) and reported on an application metrics tracking tool such as, for example, Appfit. As a result, each commit to repository may be tied back to a story and a larger roadmap. In an exemplary embodiment, Jules is the target state continuous integration/continuous deployment (CI/CD) pipeline, and Jules is already integrated with bitbucket/git.

In an exemplary embodiment, the method for accurately tracking and capturing a time to market for software applications and feature updates thereof includes the following operations: 1) In postdeploy step, collect commit metadata from the repository. 2) Extract project management software instruction set identifiers (e.g., Jira card numbers) associated with the metadata. 3) Update the respective project management software instruction sets (e.g., Jira cards). 4) Use the "Quick Notes" field to capture date of deployment and information technology service management tool change information (e.g., SNOW change information).

In an exemplary embodiment, the method is implemented as a plug-in that is invoked during the post deploy step of the CI/CD pipeline (e.g., Jules pipeline). When the plug-in is invoked, the build is already complete, and as a result, there is no increase in the build time. The plug-in may be configured to add optional project management software field names (e.g., Jira field names) if the "Fix Version" and "Labels" fields are already being used for other reporting. Because the implementation is done through a plug-in, a developer may configure the plug-in to invoke at any point during the pipeline. Thus, for any application that only deploys to test environments, the plug-in may be triggered after deploying to the test environment.

Accordingly, with this technology, an optimized process for accurately tracking and capturing a time to market for software applications and feature updates thereof is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for tracking a deployment status of an application, the method being implemented by at least one processor, the method comprising:

receiving, by the at least one processor, a first notification that a requested update to the application is stored in a memory and is ready for a deployment;

retrieving, by the at least one processor from the memory, metadata that relates to the requested update to the application;

extracting, by the at least one processor from the memory based on the retrieved metadata, first information that is associated with the requested update to the application; and modifying, by the at least one processor, the first information based on the deployment, wherein the requested update to the application is associated with a numbered information technology service management tool ticket, and wherein the first notification includes a commit to repository request message that is associated with a first project management software instruction set.

2. The method of claim 1, wherein the first information comprises at least one second project management software instruction set that is associated with the requested update to the application.

3. The method of claim 2, wherein the modifying comprises updating each of the at least one second project management software instruction set to include second information that relates to a deployment date of the requested update to the application.

4. The method of claim 3, wherein the modifying further comprises updating each of the at least one second project management software instruction set to include third information that relates to a change to the information technology service management tool ticket.

5. The method of claim 1, further comprising:

identifying at least one project management software task cluster and at least one project management software proposal that relate to the first project management software instruction set; and modifying each of the at least one project management software task cluster and the at least one project management software proposal based on the deployment.

6. The method of claim 1, further comprising:

when the first information has been modified, generating a second notification that the first information has been modified; and transmitting the second notification to at least one predetermined destination.

7. A computing apparatus for tracking a deployment status of an application, the computing apparatus comprising:

a processor;

a memory; and a communication interface coupled to each of the processor and the memory, wherein the processor is configured to:

receive, via the communication interface, a first notification that a requested update to the application is stored in the memory and is ready for a deployment;

retrieve, from the memory, metadata that relates to the requested update to the application;
extract, from the memory based on the retrieved metadata, first information that is associated with the requested update to the application; and
modify the first information based on the deployment,
wherein the requested update to the application is associated with a numbered information technology service management tool ticket, and
wherein the first notification includes a commit to repository request message that is associated with a first project management software instruction set.

8. The computing apparatus of claim 7, wherein the first information comprises at least one second project management software instruction set that is associated with the requested update to the application.

9. The computing apparatus of claim 8, wherein the processor is further configured to update each of the at least one second project management software instruction set to include second information that relates to a deployment date of the requested update to the application.

10. The computing apparatus of claim 9, wherein the processor is further configured to update each of the at least one second project management software instruction set to include third information that relates to a change to the information technology service management tool ticket.

11. The computing apparatus of claim 7, wherein the processor is further configured to:
identify at least one project management software task cluster and at least one project management software proposal that relate to the first project management software instruction set; and
modify each of the at least one project management software task cluster and the at least one project management software proposal based on the deployment.

12. The computing apparatus of claim 7, wherein the processor is further configured to:
when the first information has been modified, generate a second notification that the first information has been modified; and
transmit, via the communication interface, the second notification to at least one predetermined destination.

13. A non-transitory computer readable storage medium storing instructions for tracking a deployment status of an application, the storage medium comprising executable code which, when executed by a processor, causes the processor to:
receive a first notification that a requested update to the application is stored in a memory and is ready for a deployment;
retrieve, from the memory, metadata that relates to the requested update to the application;
extract, from the memory based on the retrieved metadata, first information that is associated with the requested update to the application; and
modify the first information based on the deployment,
wherein the requested update to the application is associated with a numbered information technology service management tool ticket, and
wherein the first notification includes a commit to repository request message that is associated with a first project management software instruction set.

14. The storage medium of claim 13, wherein the first information comprises at least one second project management software instruction set that is associated with the requested update to the application.

* * * * *